July 1, 1969 R. RINESCH 3,452,971
STATIONARY REFRACTORY-LINED REACTION VESSEL
Filed Sept. 15, 1966 Sheet 3 of 4

INVENTOR
RUDOLF RINESCH
BY

HIS ATTORNEYS

July 1, 1969

R. RINESCH 3,452,971

STATIONARY REFRACTORY-LINED REACTION VESSEL

Filed Sept. 15, 1966

INVENTOR
RUDOLF RINESCH
BY

HIS ATTORNEYS

United States Patent Office 3,452,971
Patented July 1, 1969

3,452,971
STATIONARY REFRACTORY-LINED
REACTION VESSEL
Rudolf Rinesch, Linz, Austria, assignor to Vereinigte Osterreichische Eisen- und Stahlwerke Aktiengesellschaft, Linz, Austria, a company of Austria
Filed Sept. 15, 1966, Ser. No. 579,574
Claims priority, application Austria, Nov. 25, 1965,
A 10,605/65
Int. Cl. C21c 5/42, 5/00
U.S. Cl. 266—13                         15 Claims

ABSTRACT OF THE DISCLOSURE

A steel-making plant having a plurality of parallel bays, all perpendicular to a common material input bay, is described. Each of the bays has a longitudinally extending crane runway and a plurality of transport tracks extending perpendicularly across the parallel bays. The various bays, with their crane runways and transport tracks are arranged to facilitate the preparation and charging of the steel-making vessels. Casting bays are provided and positioned to permit direct movement of the casting ladles from the steel-making vessels to the casting site. The vessels employed in the plant are of the top-blowing, reaction type, each composed of three horizontally displaceable sections. Two such vessels are used, allowing one to be relined and charged while the other is on the blowing stand. Each section of each vessel is roller mounted, permitting ready separation and assembly. The separable construction enables larger capacity vessels to be formed in a manner simplifying liner construction and avoiding thermal and mechanical stresses inherent in large, one-piece vessels.

---

Figure 1:
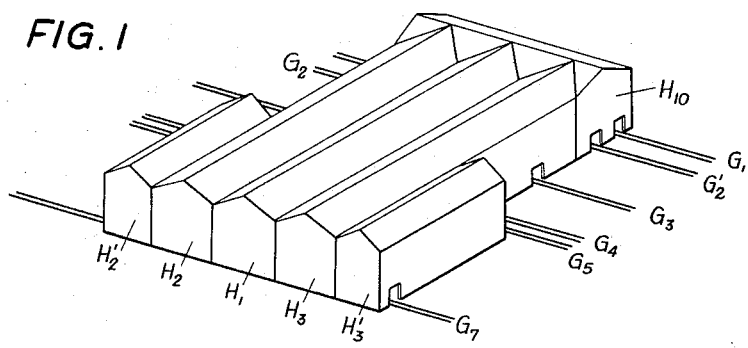

This invention relates to a stationary, refractory-lined reaction vessel for converting solid and liquid charging materials, such as pig iron and scrap, into steel, said vessel having a tapping hole near the bottom and being non-heated.

The reaction vessels which have hitherto been used for the production of steel from pig iron by top-blowing oxygen, the so-called crucibles or converters, had a cylindrical or pear-shaped form. Usually, they are supported in a carrier ring mounted to surround the periphery of the vessel, and adapted to be tilted from upright position into the upside-down position by means of trunnions connected to a tilting drive. There has been a permanent trend towards increasing the capacity of converters, and converters of the type described have recently been built with capacities of up to 300 metric tons, that is to say that the run-off output is about 300 metric tons of steel.

Experiences hitherto gained with such large-capacity converters have shown disadvantages and difficulties, as compared to the small or medium-size converters, which are functionally connected with the dimensions of the vessels. Thus, the ratio of bath surface area to bath depth and of the size of the hot spot (reaction area of the oxygen jet blown onto the metal bath) to the bath surface area become more and more unfavourable in relation to the increase in capacity, as compared to the classical oxygen top-blowing technique using medium-size converters which are of the order of 50 to 100 metric tons. The problems encountered upon an increase in converter capacity cannot even be solved by the use of multi-hole nozzles. Whereas multi-hole nozzles, in spite of their high rate of oxygen supply, cause a calmer blowing behaviour without any considerable slopping, one has to put up with a reduced durability, as compared to one-hole nozzles, and the manufacture of soft steel qualities is more difficult.

Apart from the metallurgical drawbacks described, the construction of large-size converters involves considerable difficulties also from the purely constructional and manufacturing point of view.

While the described problems can still be held under control where converters of up to 300 metric tons are concerned, a further increase in converter size following the model of the conventional tiltable vessels is no longer possible, although there is a tendency and desire towards even larger capacities of the conversion vessels. As a matter of fact, for still larger vessels, the bath surface area would have to be further increased to avoid that the bath depth becomes too great, in other words, vessels of large diameter would have to be built, which involve the unsurmountable difficulty that the annular series of refractory bricks are insufficiently stressed so that lining of the vessels is extremely difficult and the durability would consequently be very poor. Additional problems would then arise in that the temperature conditions in the vessel and in the carrier ring would be unequal; that sloppings would be induced due to local over-heating and to the formation of zones of higher and lower temperatures; that the wear of the lining is uneven; that thermal shock stressing becomes very high and deformations of the vessel and cracks occur as a result thereof. These and other difficulties have to be expected with all converter types known at present, if they are enlarged beyond a given size limit, which, as has been said, ranges at about 300 metric tons run-off weight. With vessels having welded-in carrier rings, a balancing between the different thermal expansion properties of the carrying flange-bearing middle part and the upper and lower parts would no longer be possible; with converter vessels having a separate, independent carrier ring, the clearance which has to be provided in view of the thermal expansion of the converter would no longer be compatible with the required accuracy of integration of the bearing brackets and the carrier ring. In a 300 t. converter, the total weight of the vessel including its lining and the charge therein amounts to about 1300 metric tons. The external diameter is approximately 8.5 m., and the height is about 10 m. Very thick sheet metal has to be used both for the vessel and the carrier ring, the thickness amounting to up to 200 mm. Welding such sheets involves considerable difficulties, and the use of high-grade steels of high and highest strength properties is necessary. Apparently, economy considerations also set a limit.

It is an object of the present invention to overcome the disadvantages and difficulties described by providing a stationary reaction vessel which, as compared to the previous converter constructions, can be built with considerably increased capacities and is not subject to any limitations from technical and economical points of view when the capacity is even further increased. The reaction vessel according to the invention is characterized in that it consists of at least two horizontally displaceable parts adapted to be joined to form the finished vessel, one of these parts being destined to take up the liquid bath to be refined and providing a sufficiently large reaction space for carrying out an oxygen-refining process, and the other part constituting a hood member adjoining the stack, when in the blowing position, and having means for the introduction of the charging materials, of one or several blowing lances, and of admixtures. Suitably, the lower part taking up the metallic bath consists also of two parts adapted to be horizontally displaced relative to each other and joined to each other, viz: the actual bottom part taking up the bath and an upper part which defines the reaction space and, upon junction with the hood part, forms the middle part of the vessel. The bottom part and the middle part of the vessel may diverge conically upwardly.

The vessel parts may have a circular or an approximately elliptical cross-section, in which latter case the curvatures may be replaced by short straight sections. Actually, only the internal outlines of the refractory lining must be round or elliptical. The shell of the vessel may deviate more or less from these shapes; that is to say that the shell may also have a square, oblong or polygonal cross section.

The horizontal displacement of the individual parts for the purpose of re-lining the vessel may be effected along tracks with the aid of wheels, rolls or roller bearings or the like, the tracks extending from a middle stand, which is the blowing stand, to lining stands located on either sides of the blowing stand. If three-part vessels are used, that is, such vessels which comprise the real bottom part taking up the bath, the middle part defining the reaction space, and a hood part, a total of six vessel elements will be present on the three stands together. This ensures that in the blowing stand there is always a complete vessel which is ready for blowing.

An advantage of the reaction vessel of the invention resides in that the refractory lining in the hood part may be made up from suspended bricks, whereby re-lining and repair work is considerably facilitated.

According to a preferred embodiment of the invention, the sheet metal shell of the part taking up the bath may be provided on the tap-hole side—and opposite thereof, if desired—with a door which can be closed and locked during a furnace campaign. Upon removal of that door, a ramming and clearing device for breaking up and removing the worn lining may be introduced.

The feed opening for pig iron and scrap arranged in the hood part, preferably on opposite sides thereof, may be adapted to be closed by doors, plates or the like, and on the blowing stand, adjoining the scrap feed opening, a scrap charging and preheating chamber may be arranged which, if desired, may be integral with the hood part.

According to an embodiment of the invention it is provided that in this scrap preheating chamber a pusher means for conveying the scrap is arranged which can be moved beyond the opening of the draw-off hood, the pushing surface of said pusher means being curved or inclined from bottom to top in the direction of movement.

As far as vessels consisting of several parts have already been used, e.g., vessels having a detachable bottom part, an accurate integration of the parts is necessary which has been accomplished in such manner that the two parts are joined with annular flanges and connected by screws and wedges. In the device according to the invention this is not provided for. As the vessel is not tiltable, the weight of the superposed vessel parts constituting the finished vessel effects a sufficient seal. The narrow annular gaps between the individual parts may be sealed by plastic refractory materials and are finally closed during operation by slag running down the inner wall of the refractory lining. If desired, it is also possible to provide pressure devices, consisting e.g. of hydraulic lifting means, beneath the bottom of the part taking up the liquid bath.

According to a further aspect of the invention a steelmaking plant including a reaction vessel of the described design is provided which is characterized in that it comprises a bay containing items for the preparation of solid charging materials, and at least three parallel bays arranged perpendicularly to the first-mentioned, bay, whereof, over part of their longitudinal extension, namely in the part adjacent to the first-mentioned bay, the central bay includes the blowing stand which is flanked in the two adjoining bays by the lining stands, and whereof, over the other part of their longitudinal extension, the central bay constitutes a charging and preparing bay and the two bays disposed laterally thereof constitute casting bays, each of said bays being provided with crane runways extending longitudinally of said bays as well as transport tracks running parallel to the longitudinal direction of the first-mentioned bay.

Figure 2A:
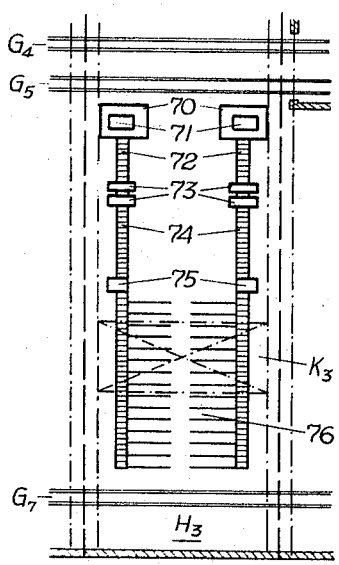
Figure 2B:
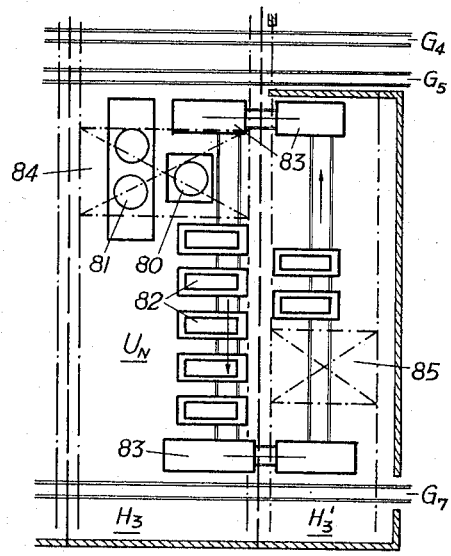
Figure 7:
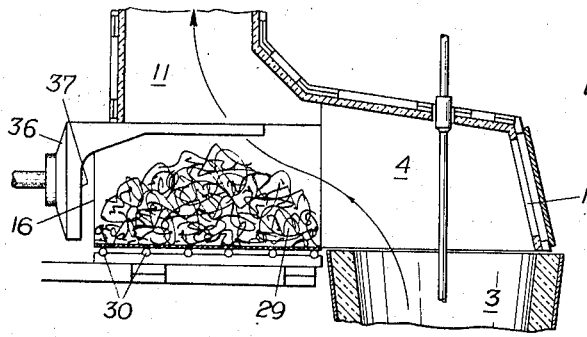
Figure 2:
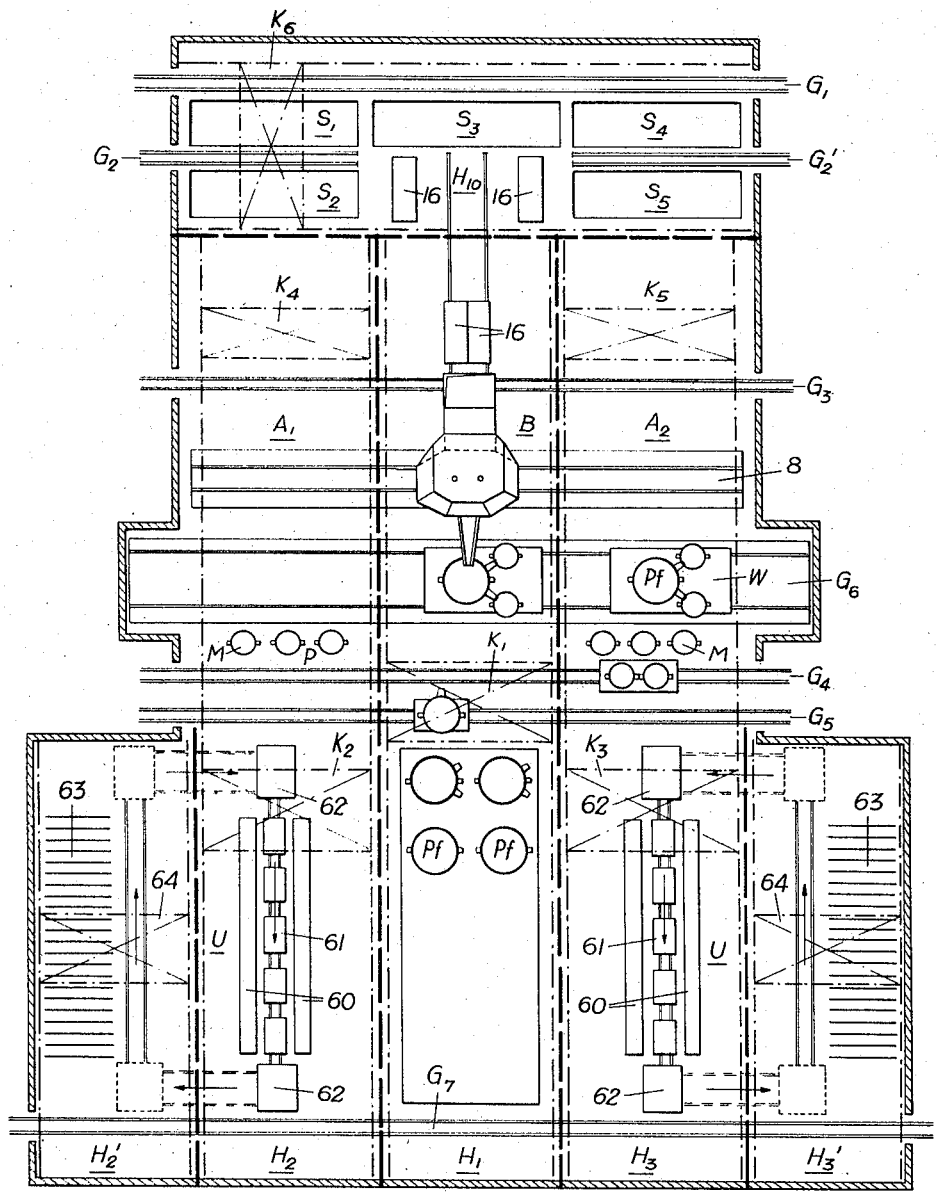
Figure 3:
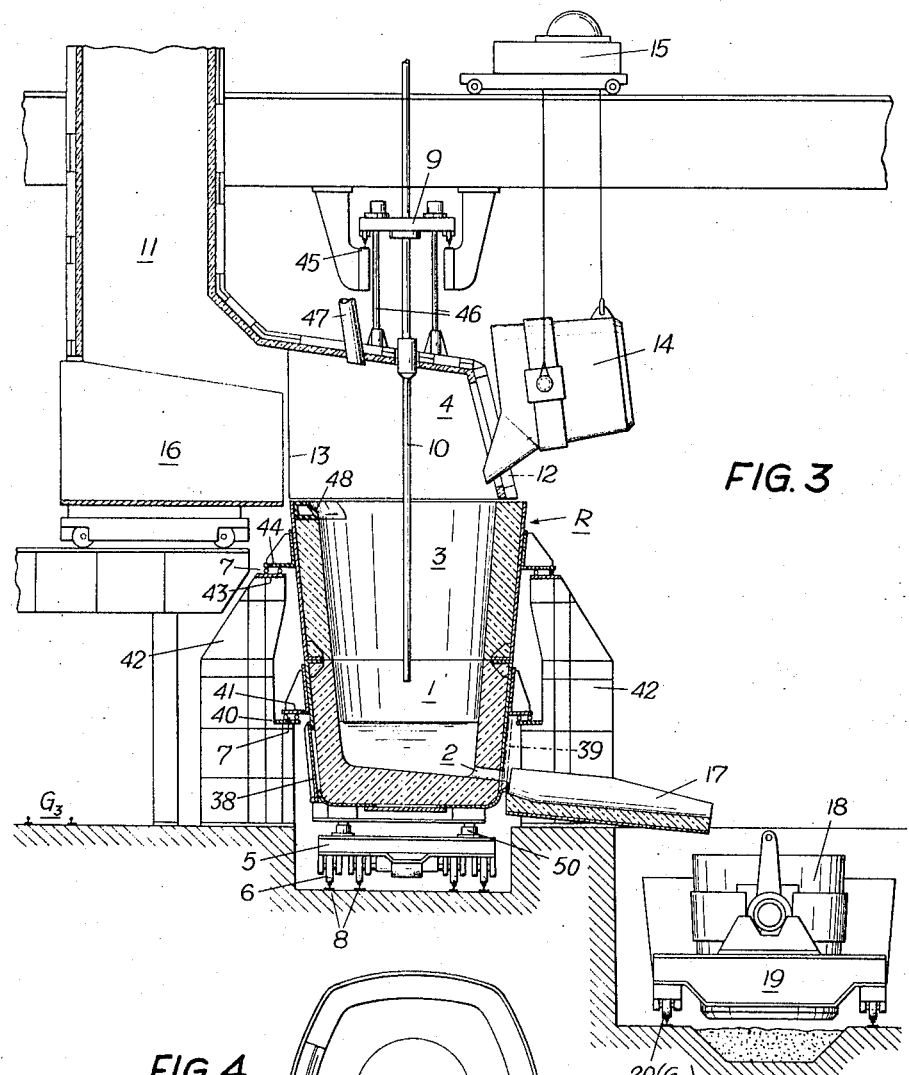
Figure 4:
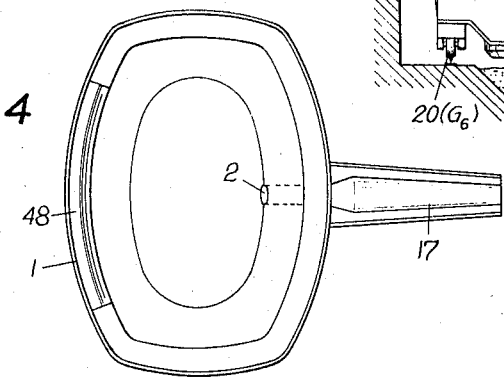
Figure 5:
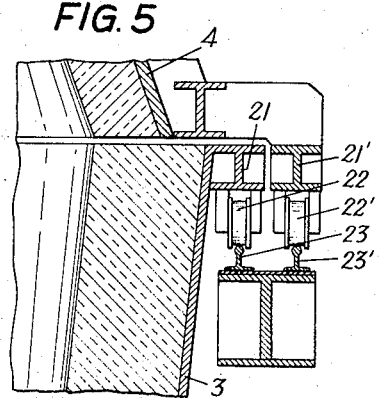
Figure 6:
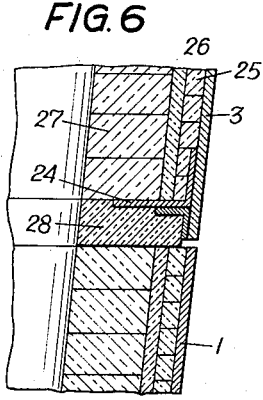
Figure 8:
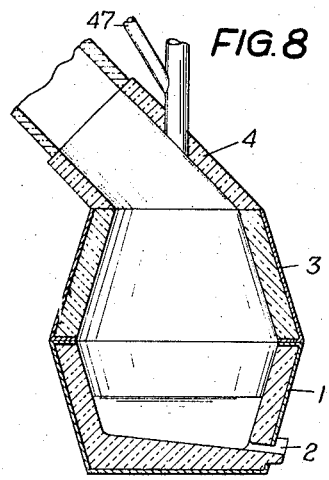
Figure 9:
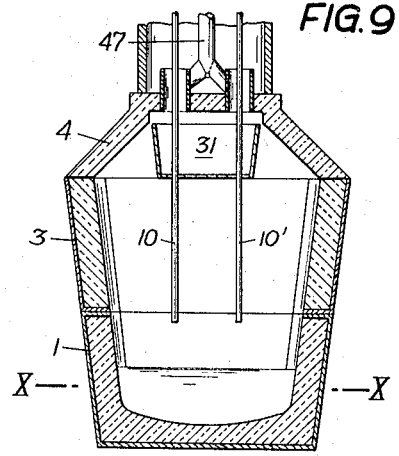
Figure 10:
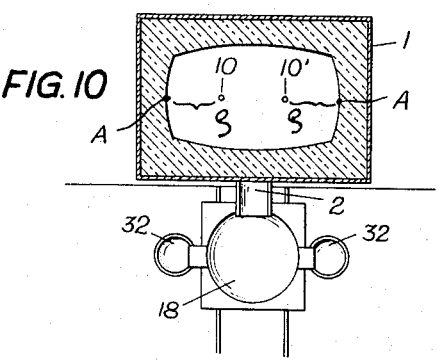

The invention is diagrammatically illustrated by way of several exemplary embodiments in the accompanying drawing. FIG. 1 is a diagrammatic view and FIG. 2 is a plan of a steelmaking plant, wherein a reaction vessel designed in accordance with the invention is flanked by two lining stands, the auxiliary devices and accessories being likewise indicated. FIGS. 2a and 2b illustrate variations of the plot shown in FIG. 2. FIG. 3 is an elevation of an embodiment of the reaction vessel of the invention, and FIG. 4 is a plan thereof. FIG. 5 shows the supporting structure for the middle part and the hood part of the vessel, and FIG. 6 illustrates the design of the butt joints of the assembled reaction vessel. FIG. 7 illustrates a modified embodiment of the hood part comprising a scrap-preheating chamber. In FIGS. 8, 9 and 10 modified embodiments of a reaction vessel according to the invention are shown.

The steelmaking plant shown in FIGS. 1 and 2 in perspective view and in plan view, respectively, is characterized in that perpendicularly to a bay $H_{10}$ there are three, or four or five bays arranged in parallel, being designated by $H_1$, $H_2$ and $H_3$, and $H_{2'}$, and $H_{3'}$, respectively. Each of the bays has a crane runway in its longitudinal direction, as will be described in more detail hereinafter, and tracks extending in parallel to the longitudinal direction of bay $H_{10}$, as will also be described in detail hereinafter.

In bay $H_{10}$ there are scrap yards designated by $S_1$, $S_2$, $S_3$, $S_4$ and $S_5$ and served by scrap tracks $G_1$ and $G_2$ and $G_{2'}$, respectively. In the bays adjoining bay $H_{10}$ in perpendicular direction, there are the blowing stand B, namely in the central bay $H_1$, and the lining stands $A_1$ and $A_2$ flanking the blowing stand in bays $H_2$ and $H_3$. In longitudinal direction of these bays crane runways are provided, viz.: in bay $H_2$ runway $K_4$ and the foundry crane runway $K_2$, and in bay $H_3$ crane runway $K_5$ and foundry crane runway $K_3$. The cranes of said runways can travel over the total area of the bays. In bay $H_1$ a charging crane runway $K_1$ is provided which extends as far as to the blowing stand B, and in bay $H_{10}$ is the crane runway $K_6$.

Parallel to bay $H_{10}$ and to the scrap tracks there are the further tracks which extend through bays $H_2$, $H_1$ and $H_3$, viz.: track $G_3$ which is destined for the transport of refractory material; track $G_4$, on which the slag thimble lot P is situated and which is destined for the transport of slag. $G_5$ is a pig iron track reaching into the range of the charging craneway $K_1$, which, as has been mentioned hereinbefore, extends to the blowing stand B. Track $G_6$ serves for the transport of the transfer cars W, on which there are the slag thimbles M and the casting ladles $Pf$. From track $G_6$ the casting ladles and the slag thimbles may be removed by the cranes of runways $K_1$, $K_2$ and $K_3$. That part of bay $H_1$ which lies in front of the blowing stand serves not only as a preparing bay but also as a charging bay. There, the stands for the lining and the preheating of the ladles $Pf$ are provided. Another track is arranged in the longitudinal direction of bay $H_1$, namely, between the blowing stand B and the scrap yard $S_3$ and serves for conveying the scrap boxes 16 from the scrap bay to the blowing stand.

In the lower portion of bays $H_2$ and $H_3$ shown in FIG. 2 the casting operations are carried out. These parts of bays $H_2$ and $H_3$ thus may be referred to as casting bays. $G_7$ is a stripping track.

As illustrated, each of the casting bays $H_2$ and $H_3$ may be flanked by a further casting bay $H_{2'}$, and $H_{3'}$, respectively. In the representation of FIG. 2 a cycle casting pit U for ingot casting is provided between the bays $H_2$ and $H_{2'}$ on the one hand and between $H_3$ and $H_{3'}$ on the other hand. There, numeral 60 denotes the pouring platform, numeral 61 the pouring car with moulds, numeral 62 transfer cars, numeral 63 mould grid and mould preparation site, and numeral 64 a stripping crane.

However, it is also possible to modify that part of the steelmaking plant in dependence on the requirements and the manufacturing programme. For instance, the side bays $H_{2'}$ and/or $H_{3'}$ may be omitted, and a continuous casting plant may be provided in one or both of the bays $H_2$ and $H_3$; also, a pressure die casting plant may be provided on one or either side of the plant (in bays $H_2/H_{2'}$ or $H_3/H_{3'}$). Of course, it is also possible to provide a cycle casting pit for ingot casting on one side, as in FIG. 2, that is, e.g. in bays $H_2$ and $H_{2'}$, and a continuous casting plant in bay $H_3$, in which case bay $H_{3'}$ may be disposed of. Any desired other combinations are feasible.

In FIG. 2a the modification is illustrated in which bay $H_3$ comprises a continuous casting plant. There, numeral 70 designates the casting machine, 71 is the tundish, 72 the cooling bank and the feed rollers, respectively, 73 is the straightening machine, 74 a pinch roller table, 75 the cutting equipment, and 76 the cooling bed.

In FIG. 2b the modification is illustrated wherein a pressure die casting plant is arranged in bays $H_3$ and $H_{3'}$. In the drawing, $U_N$ denotes the cycle casting pit for die casting, 80 the casting plant with pressure vessel, 81 the tube preheating equipment, 82 a transport car with graphite molds, 83 a transfer car, 84 a casting crane, and 85 a stripping crane.

In FIG. 3 the reaction vessel is generally denoted by R. It consists of a bottom part 1 which takes up the liquid bath and has a tap hole 2 capable of being closed, and of a middle part 3 and a hood part 4. The three parts 1, 3 and 4 are horizontally displaceable, namely, the bath-holding part 1 by means of a bogie 5 running on wheels 6 along rails 8 provided in a pit and by means of oppositely arranged roller tracks formed by provision of roller 7 between a supporting surface 40 of the housing 42 and a suporting flange 41 projecting from vessel part 1; vessel part 3 also by means of oppositely arranged roller tracks formed by provision of roller 7 between a supporting surface 43 of the housing 42 and a supporting flange 44 projecting from the vessel part 3; and the hood part 4 by means of a hood carriage 9 comprising a lifting jack and arranged to be movable along rails extending in the longitudinal direction of bay $H_1$ on support beams 45, the hood part being suspended in said carriage by means of spindles or hydraulic lifting devices 46. All three parts of the vessel are provided with a refractory lining, as indicated. The hood part 4 is centrally penetrated by a blowing lance 10, is provided further with an opening formed with a socket 47 for admixtures, and adjoins the stack designated by 11. On bogie 5, underneath the bottom of the bottom part 1 of the vessel, there are hydraulic pressure means, such as jacks 50 which are destined for lifting the bottom part and pressing it against parts 3 and 4.

As is evident from the showing of FIG. 3, the hood part has feed openings arranged opposite to each other and adapted to be closed by doors, viz: feed opening 12 for pig iron and feed opening 13 for scrap. The upper rim of the reaction vessel, on the side of the feed opening 13, is shaped to form an arched sill 48 of approximately trapezoidal cross section; it may be water-cooled. This accomplishes a protection of the vessel rim from damages caused by the scrap dropping thereon. At 14 a hot-metal ladle is shown in the moment of charging, carried by a charging crane 15. 16 is a movable scrap chute. Finally, FIG. 3 shows a launder 17, which may be brought into and out of tapping position by means of the charging crane; and numeral 18 denotes a casting ladle mounted on a transfer car 19. This transfer car runs on rails 20 disposed underneath mill floor level.

In FIG. 4 an elliptical cross section of the vessel is shown, but of course the plan may also be circular.

In FIG. 5 a modified device for the horizontal displaceability of the middle part 3 and of the hood part 4 is illustrated. Both the middle part 3 and the hood part 4 are suspended on carrying structures 21 and 21', respectively, which are connected to wheels 22 and 22' running on two parallel rails 23 and 23'.

The partition of the reaction vessel assembled from the furnace parts 1 and 3 is preferably realised at a level corresponding to half or two thirds of the total height of the vessel.

As is apparent from FIG. 3, the lower part 1 and the middle part 3 of the reaction vessel in a preferred embodiment are designed to expand conically outwardly. This design has, on the one hand, the advantages that charging of the pig iron can be easily effected through opening 12, and, on the other hand, it has the advantage that the lining of the vessel parts 1 and 3 is highly facilitated in that the same brick size may be used in all regions of the wall and that arches etc., as occurred in the so-called hood of pear-shaped converters, need not be taken into account. It is further advantageous in this embodiment that the velocity of the escaping gases is not increased by throttle passages (narrowings), but is reduced due to the expansion of the mouth. This brings about considerable advantages during the course of reactions, as any ejected slag or steel drops are retarded, as it were, and fall back into the reaction vessel. Also the relining of the hood part 4 is very simple in the illustrated design of approximately trapezoidal vertical cross section. The lining may be realised as a suspended roof, as a semi-suspended roof, or as a normal furnace arch.

In the illustrated reaction vessel the shape of the individual parts resembles constructions which individually have been in common use for a long time in furnace practice and which have stood the test satisfactorily. The division of the vessel into parts 1, 3 and 4 involves no risk of break-outs or other operating troubles. Sealing of the joints in the reaction zone, that is, between parts 1 and 3, may be effected by means of plastic refractory materials. This is shown in FIG. 6. There, numerals 1 and 3 denote the sheet metal shell of the lower and middle parts, and 24 is a supporting flange surrounding sheet metal shell 3. Adjacent to the sheet metal shell the permanent lining bricks 25 are arranged; then comes a rammed layer 26, followed towards the inside by the series 27 of bricks of the working lining. 28 is a plastic refractory material by which the gap between the bottom part 1 and the middle part 3 is sealed.

Between middle part 3 and hood part 4 no such sealing is required. It is even desirable that air can infiltrate there so that the carbon monoxide escaping through the hood part 4 into the stack is partially or completely burned. The CO combustion may be controlled by an adjustable down-draft arranged behind the stack so that the waste gas temperature behind the hood 4 can be controlled as desired. Moreover, in order to provide for a more uniform and complete combustion of the CO, secondary air may be introduced in a known manner by special ventilators into or behind the hood region.

The chemical and sensible heat of the furnace gases may thus be utilised for pre-heating scrap and admixtures. To this end, the hood part 4 may expand towards one side to form a scrap preheating chamber, as illustrated in FIG. 7. This scrap pre-heating chamber, which is integral with the hood part, is designated by numeral 29. The scrap pre-heating chamber and the front portion of hood 4 adjoin the stack 11.

On the bottom of the scrap pre-heating chamber there are rollers 30 on which scrap charging trays may be moved. A suitable embodiment of such a charging tray is characterized in that it is U-shaped and open on the front and back sides. The lateral walls may be double-walled and provided with water cooling means.

Discharging of the charging trays into the pre-heating chamber is preferably effected by means of the pusher device 36, the pusher surface 37 of which is bent or inclined in the direction of movement from bottom to top.

If a reaction vessel according to the invention is equipped with such a scrap pre-heating chamber, the hot waste gases evolved during a refining process penetrate and heat up the scrap before they escape through the stack 11. The gases exhausted through the stack may be purified and cooled as is known in connection with the conventional converter operation. Also the provision of waste heat boilers in the stack is feasible in the plant of the invention.

Sampling and immersion temperature measurement may be effected through opening 12 in the hood part 4 or through another aperture provided at a suitable place. As has already been mentioned hereinbefore, the opening 12 can be closed by a door.

Further doors are suitably provided in the bottom part of the vessel on opposite sides. These doors are indicated at 38 and 39 in FIG. 3. They serve for the removal of the worn refractory lining at the end of a furnace campaign, which operation is carried out in the lining stand. The doors 38 and 39 thus are detached, a ramming and clearing device for breaking up and removing the worn brickwork is inserted, and then the re-lining material is introduced in like manner.

In FIG. 8, on the one hand, and in FIGS. 9 and 10, on the other hand, two further modified embodiments of three-part reaction vessels according to this invention are illustrated.

Of these figures, FIG. 8 shows a reaction vessel of circular cross section, consisting of parts 1, 3 and 4. The tapping hole 2 is designed as in an open-hearth furnace. Tapping may be effected into the casting ladle, as described in connection with FIG. 3. Also a forked tapping spout, of known design may be used. The casting ladle may comprise a skimmer.

The refining vessel shown in an elevational view in FIG. 9 and in a plan view in FIG. 10 is suitable for plants of very high capacity having an output of 400 or 500 metric tons. Again the vessel is a three-part construction and comprises parts 1, 3 and 4. It has a substantially elliptical cross section and comprises two blowing lances 10, 10' disposed in the centres of curvature belonging to the vertices A of the ellipse. The distance $s$ of these centres of curvature from the vertex A is $b^2/a$, $b$ being the short axis and $a$ the long axis of the ellipse. The proportion of the elliptical axes, $a:b$ should be about 1.3:1 and, accordingly, the ratio of length to diameter about 1.6. In a 400 t. vessel, $b$ would be about 3.4 m. and $a$ 4.4 m. so that $s$ would be 2.57 m. In a 500 t. vessel having an analogous elliptical ground plot $a=5.05$ m. and $b=3.82$ m., resulting in a distance of the lances from point A of 2.9 m. The zones of reaction formed upon impingement of the oxygen jets overlap. However, the centres of these zones of reaction, that is to say, the hot spots wherein temperatures as high as 2500° C. prevail, are spaced at a sufficient distance from the refractory lining so that the lining is not over-stressed. In the hood part 4 a scrap tray 31 is provided, the walls of which may be water-cooled. Underneath the tapping hole 2 there is a casting ladle 18, as described in connection with FIG. 3 and laterally thereof there is a slag ladle 32 on either side.

The described vessel design results in favourable cross sections of the vessel which may be expected to provide for uniform refining of the bath and a good durability of the lining. The bath depth does not exceed about 1.6 to 1.7 m., which corresponds to the bath depths of the largest 300 t. oxygen top-blowing vessels.

The new vessel shape according to the invention permits of the desired increase in capacity and output, without having to put up with the metallurgical and constructional difficulties which have been referred to at the outset. The well-tried and simple design of the constituent parts provides for a trouble-free and safe operation. Due to the arrangement of the reaction vessel on mill floor level instead of the elevated platform employed in conventional converter practice, the costs of the sheds are reduced, and the overall investments are held at a moderate level owing to the possibility of replacing the individual parts of the refining vessel by reserve parts within in a short time.

In the refining vessel according to the invention all types of known steelmaking processes, as are carried out in small and medium-size tiltable converters, can be operated without difficulties. In particular, also the various techniques comprising supplying heat may be put into effect in the reaction vessel of the invention in such cases, when the hot metal to be refined is chemically cold or when solid charging materials such as scrap are to be substituted for part of the hot metal.

What I claim is:

1. A stationary refractory lined vessel for the conversion of solid and liquid ferrous charging materials into steel comprising, at least two horizontally displaceable parts each adapted to be horizontally moved into superposed relationship, one atop the other, to form the finished vessel, the lower part of said vessel being adapted to receive the ferrous bath to be refined and providing a sufficiently large reaction space for carrying out an oxygen top-blowing process, and a tapping hole near the bottom of said lower part, the top part of said vessel comprising a hood part adjoining a stack when in the assembled blowing position, and having means for the introduction of charging materials, of at least one blowing lance, and of admixtures.

2. A reaction vessel as set forth in claim 1, wherein said lower part consists of two parts adapted to be horizontally displaced relative to each other and to be joined to each other, said two parts comprising the actual bottom part holding the bath and an upper part which defines the reaction space and, upon junction with said hood part, forms the middle part of the vessel.

3. A reaction vessel as set forth in claim 1, wherein said lower part of the vessel diverges conically upwardly.

4. A reaction vessel as set forth in claim 1, wherein said vessel parts have a circular cross section, said hood part having means for inserting a blowing lance centrally into said vessel.

5. A stationary refractory-lined reaction vessel for the conversion of solid and liquid ferrous charging materials into steel, having a tapping hole near its bottom, said reaction vessel comprising at least two horizontally displaceable parts adapted to be assembled in superposed relationship to form the finished vessel, a lower part being destined to receive the ferrous bath to be refined and to provide a sufficiently larger reaction space for carrying out an oxygen top-blowing process, and a top part constituting a hood part adjoining a stack, when in the assembled blowing position, and having means for the introduction of charging materials, of a pair of blowing lances, and of admixtures, said top and lower parts of said vessel having an elliptical cross-section, the curvatures of which may be replaced by short straight sections, said blowing lances being inserted substantially in the centers of curvature of the elliptical cross-section.

6. A reaction vessel as set forth in claim 1, wherein the horizontal displacement of the constituent parts of the vessel is effected along tracks by rolling means, said tracks extending from a central blowing stand to lining stands arranged on either side of said blowing stand.

7. A reaction vessel as set forth in claim 1, wherein the refractory lining in the hood part is made up from suspended bricks.

8. A stationary steel-making vessel comprising a sheet metal shell and a refractory lining and having a tapping hole near its bottom, said vessel being assembled from at least two superposed parts arranged to be horizontally displaceable from a blowing stand to at least one relining stand, a lower part being destined to hold a ferrous bath to be refined and to provide a sufficiently large reaction space to enable carrying out an oxygen top-blowing process, and a top part forming a hood connecting said lower part to a stack and having openings therein for feeding ferrous charging materials and admixtures and for inserting at least one blowing lance, one of said openings being a scrap feed opening which has a scrap pre-heating chamber joined thereto, when said vessel is in said blowing stand.

9. A vessel as set forth in claim 8, wherein the feed openings for pig iron and scrap are arranged opposite to each other in said hood and adapted to be closed by doors.

10. A vessel as set forth in claim 8, wherein pusher means for advancing the scrap are arranged in said scrap pre-heating chamber and movable beyond said opening in said hood, the pusher surface of said means diverging from the direction of movement from bottom to top.

11. A vessel as set forth in claim 8, wherein the sheet metal shell of said bath-holding part is provided at least on the side of said tapping hole with a door adapted to be closed and locked during a furnace campaign, said door when open providing access through said shell for the insertion of a ramming and clearing device for breaking up and removing worn brickwork within said shell.

12. A vessel as set forth in claim 8, wherein for joining the constituent vessel parts hydraulic lifting devices are provided on the bottom part.

13. A steel-making plant including a stationary, bottom-tapped, refractory-lined reaction vessel assembled from at least one horizontally displaceable vessel body part and a horizontally displaceable hood part adapted to establish connection with a stack and having feed openings for charging materials and admixtures and insertion means for at least one blowing lance therein, said plant further comprising a first bay containing items for the preparation of solid charging materials, and at least three parallel bays arranged in perpendicular direction to said first bay, whereof in one portion of their longitudinal extension, namely in the portion adjacent to said first bay, the central bay includes a blowing stand which is flanked in the adjoining bays by lining stands, and whereof in the other portion of their longitudinal extension, the central bay constitutes a charging and preparing bay and the two bays arranged laterally thereof constitute casting bays, each of said three parallel bays having crane runways extending in the longitudinal direction of said bays as well as transport tracks running parallel to the longitudinal direction of said first bay.

14. A plant as set forth in claim 13, wherein at least one of said casting bays is flanked by a further casting bay, cycle casting pits being provided between the adjacent casting bays.

15. A plant as set forth in claim 13, wherein at least one of said casting bays has a continuous casting plant disposed therein.

References Cited

UNITED STATES PATENTS

| Re. 10,481 | 5/1884 | Clapp et al. | 266—35 |
| 233,571 | 10/1880 | Stanton et al. | 266—35 |
| 324,903 | 8/1884 | Weimer | 266—35 X |
| 384,628 | 6/1888 | Johnson | 266—35 |
| 501,139 | 7/1893 | Heaton et al. | 266—35 X |
| 698,787 | 4/1902 | Behrend | 266—35 |
| 3,093,253 | 6/1963 | McFeaters et al. | 266—13 X |
| 3,215,425 | 11/1965 | Vogt | 266—35 |
| 3,224,750 | 12/1965 | Baum | 266—35 |
| 3,271,020 | 9/1966 | Heemeyer | 266—13 |
| 3,257,105 | 6/1966 | Heemeyer | 266—13 |

J. SPENCER OVERHOLSER, *Primary Examiner.*

R. SPENCER ANNEAR, *Assistant Examiner.*

U.S. Cl. X.R.

164—273; 266—35